Nov. 14, 1961 L. J. CASTRIOTA ET AL 3,009,150
SYSTEM FOR RECEIVING WEAK RADIO SIGNALS IN
THE PRESENCE OF JAMMING SIGNALS
Filed July 23, 1956 2 Sheets-Sheet 2

INVENTORS
Liborio J. Castriota
BY Herbert J. Carlin
Ralph B. Stewart
Attorney

United States Patent Office 3,009,150
Patented Nov. 14, 1961

3,009,150
SYSTEM FOR RECEIVING WEAK RADIO SIGNALS IN THE PRESENCE OF JAMMING SIGNALS
Liborio J. Castriota, Yonkers, and Herbert J. Carlin, Hicksville, N.Y., assignors to Polytechnic Institute of Brooklyn, Brooklyn, N.Y., a corporation of New York
Filed July 23, 1956, Ser. No. 599,655
6 Claims. (Cl. 343—180)

This invention relates to radio carrier-wave communication systems. In particular, it concerns a system for the continuous reception of a weak signal in the presence of a much stronger signal transmitted on a carrier wave of a frequency which is the same as or close to the carrier-wave frequency of the signal to be received.

Since the weak signal may be received or observed continuously through the stronger signal radiation, the system may be called a "continuous look-through system".

One obvious application of the invention is in a system for jamming the operation of another communication system, such as enemy communications in war.

A broad object of the invention is to devise a continuous look-through system in which a high-level broadband noise-modulated transmitter and a sensitive receiver may be coupled to a common antenna.

Another object is to provide a receiver in which the signal or noise modulation of the local transmitter is reduced or substantially eliminated.

A further object is to devise a receiver in which the direct current pulse of the received weak signal is reduced or substantially eliminated in the intermediate frequency amplifier.

The invention is illustrated in the accompanying drawing in which.

Figure 1:
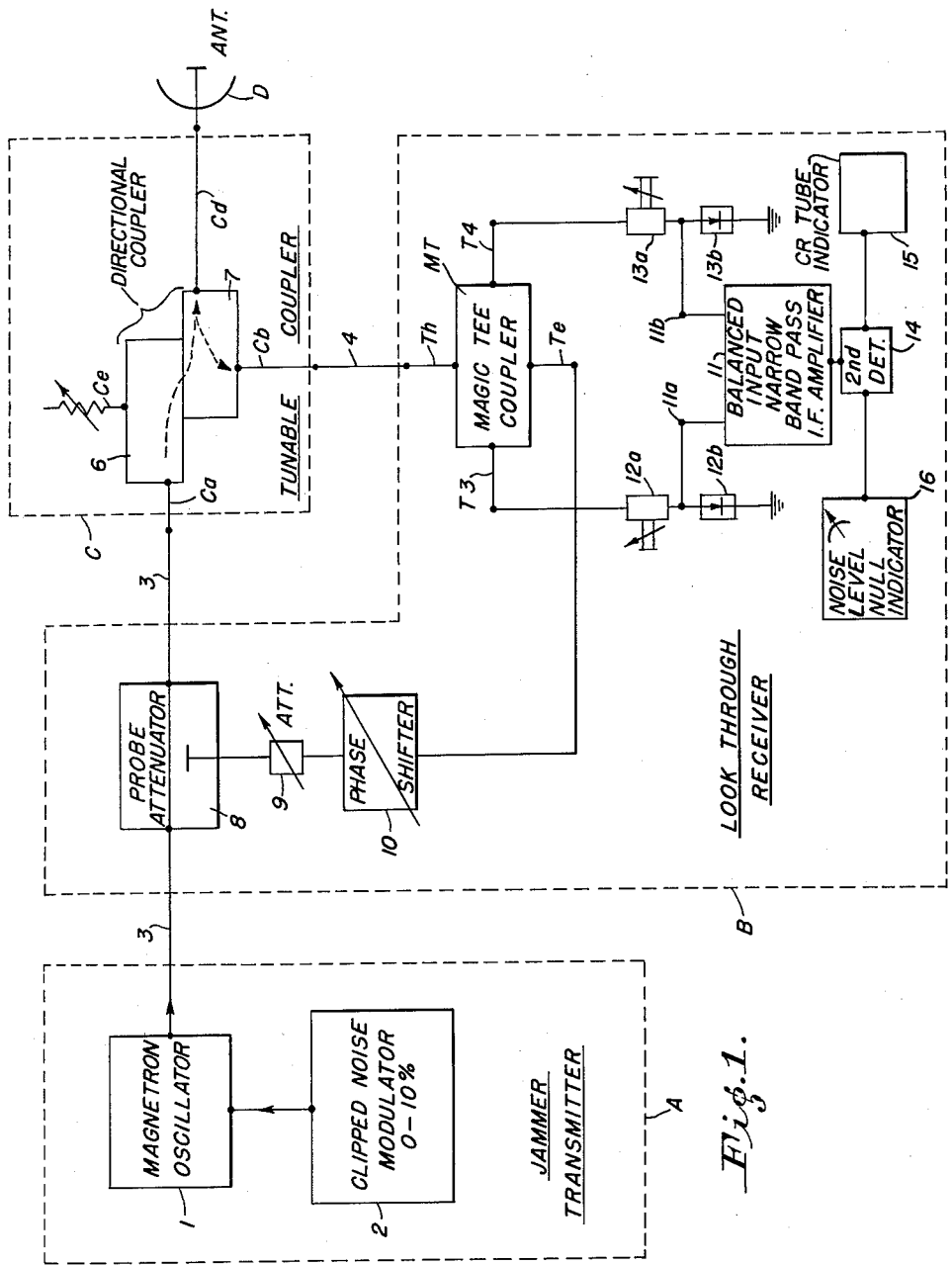
FIGURE 1 is a block diagram showing the complete look-through system.

Referring to the drawing, the local transmitting apparatus is indicated generally in the dotted rectangle A, while the receiving apparatus is represented generally within the rectangle B. The transmitter and receiver are coupled through a duplexing or directional coupler C to a common antenna D.

The local transmitter is formed of conventional apparatus such as an oscillator 1 modulated by a signal source 2 such as a noise generator. The transmitter is connected by line 3 to the arm Ca of the coupler C while the receiver B is connected to coupler arm Cb through line 4. Coupler arm Cd is connected to the antenna D, and a suitable adjustable balancing load 5 is connected to coupler arm Ce. The coupler C is formed of any suitable 4-terminal or arm network which provides good energy transfer from arm Ca to arm Cd, but very low coupling from arm Ca to arm Cb. It also provides good energy transfer from arm Cd to arm Cb, and a minimum amount of coupling from arm Cd to arms Ca and Ce. As diagrammatically represented in FIGURE 1, the duplexing coupler may be a directional coupler formed of two waveguide sections 6 and 7 arranged parallel of each other and coupled through an aperture formed in a common wall.

The signal received from a distant station is supplied from coupler arm Cb through line 4 to the receiver where it is mixed with a small amount of energy from the local transmitter which combines with the incoming wave to produce a beat wave of intermediate frequency which, after being amplified and detected, is supplied to a suitable detector. The mixer embodied in the receiver includes a magic tee coupler MT of known construction and having four arms Te, Th, T3, and T4. The received signal from the coupler C is supplied to the "H" arm Th, while the locally generated wave to be combined with the received wave is supplied to the "E" arm Te. This wave energy is derived from the line 3 by means of a probe attenuator 8, a variable attenuator 9, and a suitable phase shifter 10 being connected in series between the probe attenuator and the coupler MT. A small amount of energy from transmitter A is also transmitted into the receiver channel through the coupler C to the arm Th of the mixer MT.

The two side arms T3 and T4 are connected through suitable detector circuits to the two input terminals of a balanced intermediate frequency narrow bandpass amplifier 11. The connection from arm T3 includes a suitable tuner 12a and a detector 12b connected in series. Likewise, connection from arm T4 includes a suitable tuner 13a and a detector 13b connected in series. Tuners 12a and 13a preferably are of the slide-screw type involving an adjustable screw extending into the slot of a slotted waveguide section and being adjustable along the length of the section. The input terminals 11a and 11b of amplifier 11 are connected across the ungrounded terminals of detectors 12b and 13b.

The output of amplifier 11 is supplied to a second detector 14 which in turn energizes a suitable indicator 15, such as a cathode ray oscilloscope having a type A scan. The second detector may also energize a noise level null indicator 16.

Figure 2:
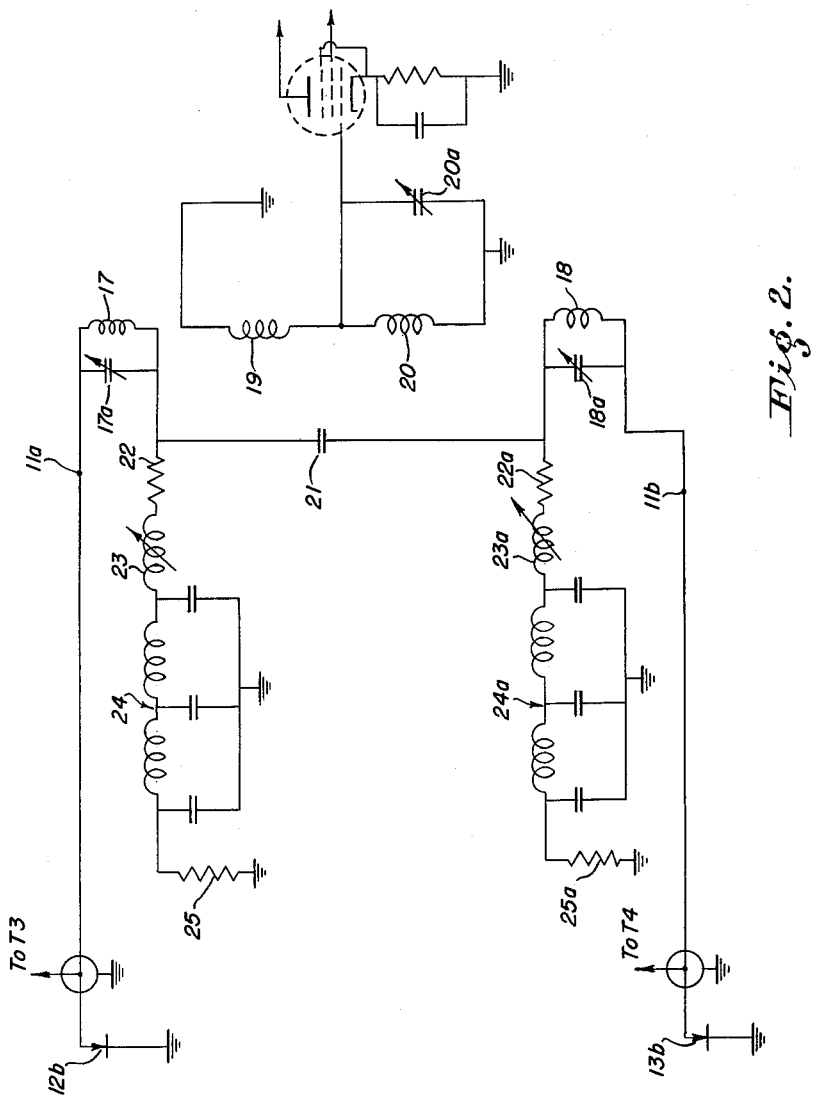
FIGURE 2 is a circuit diagram illustrating certain details of the intermediate frequency amplifier in the receiver.

FIGURE 2 shows the input circuit and first stage of the balanced intermediate frequency amplifier 11 of FIGURE 1. Between input terminals 11a and 11b is connected a balanced transformer having two primary coils 17 and 18 and two secondary coils 19 and 20 wound upon the same form. Coils 19 and 20 are wound in reverse direction, and coils 17 and 18 are wound adjacent the outer ends of coils 19 and 20, respectively. The outer terminals of coils 17 and 18 are connected to input terminals 11a and 11b, respectively, while the inner terminals of coils 17 and 18 are effectively connected together by a condenser 21. The inner terminal of coil 17 is also connected to ground through a direct current path including resistor 22, a variable inductance 23, a low-pass filter 24, and another resistor 25. In a like manner, the inner terminal of primary coil 18 is connected to ground through a direct current path formed of like elements 22a, 23a, 24a, and 25a.

The inner terminals of secondary coils 19 and 20 are joined together and form the ungrounded terminal of the secondary circuit which is connected to the control grid of the first stage of the intermediate frequency amplifier. The two outer terminals of coils 19 and 20 are connected together to form the grounded terminal of the secondary circuit.

In securing effective noise suppression, it is important that the transformer be properly balanced, that is, the two primary coils should have the same inductance, the two secondary coils also should have the same inductance, and there should be the same coupling coefficient in the two halves of the input transformer. The addition of the two balancing circuits 22—25 and 22a—25a makes the input circuit behave in a manner similar to a directional device and increases the noise suppression. The combined impedance of these two balancing circuits, which are effectively connected between ground and the mid point of the two primary coils, should match the impedance between these points as presented by the primary. The by-pass condenser 21 between the inner ends of the two primary coils ensures that these terminals are maintained at the same potential. It will be found that the impedance presented by the primary at these two terminals will be an inductive impedance which can be matched by adjustment of the series combination of resistor 22 and variable inductance 23, and the series resistor 22a and variable inductance 23a.

For best observation, it is desirable that the two crystal detectors 12b and 13b should also be matched, but this is not essential, and a certain amount of mismatch between the crystals can be compensated for by adjusting the balancing circuits 22—25 and 22a—25a.

It will be understood that the local transmitter 1 will operate at a frequency differing from the received or "victim" signal to produce a beat signal which can be amplified by I.F. amplifier 11. For example, if the amplifier is designed to pass frequencies in a narrow band around 1 megacycle (a narrow band of 100 kc.), the transmitted wave should have a frequency 1 megacycle higher or lower than the received wave. Such a beat wave frequency would be suitable for operation at carrier wave frequencies of the order of 9300 megacycles per second.

The divided input circuit of amplifier 11 is tuned to the beat wave by suitable condensers 17a and 18a connected across primary coils 17 and 18. The secondary circuit also is tuned by a suitable condenser 20a.

The outputs of the crystal detectors will include D.C. pulses resulting from the received signals as well as signal pulses of intermediate frequency. Since the D.C. pulse outputs of the two crystals are applied in in-phase relation across push-pull input circuit of amplifier 11, and secondary coils 19 and 20 are wound in opposing relation, the D.C. pulse component will be greatly reduced or substantially eliminated at the first stage of the amplifier. By suitable adjustment of the phase-shifter 10 in the line supplying the arm Te of the mixer MT, the noise component from the jammer transmitter can be substantially eliminated from the output of amplifier 11. Proper adjustment of the phase-shifter is made by observing the signal on the scope 15. For improper adjustment of the phase-shifter, the spikes of the received signal are substantially masked or obscured by the noise signal, but proper adjustment reduces the noise signal background and allows the received signal spikes to stand out clearly on the screen.

We claim:

1. A radio wave system comprising a carrier-wave generator, a noise generator impressing noise modulations upon said carrier wave, a transmission channel for radiating said noise-modulated carrier wave, a receiver including a magic-T mixer, a receiving channel connected to the H arm of said mixer and being tuned to receive a signal from a remote point of a different frequency from said carrier wave generator and being coupled locally to said transmission channel to pick up a small amount of energy therefrom, a transmission line including a variable attenuator and a variable phase-shifter for diverting energy of adjustable phase and amplitude from said transmission channel into the E arm of said mixer, a detector connected to each side-arm of said mixer and operating to derive beat-frequency signals and direct-current pulses from the signal energy supplied to the H and E arms of said mixer, an indicator, and circuit means connecting said detectors to said indicator in opposing relation with respect to said direct-current pulses and in cumulative relation with respect to said beat-frequency signals.

2. A radio wave system for receiving a weak signal in the presence of a strong signal transmitted from a local transmitter having a carrier-wave generator, said system comprising a pick-up circuit receiving said weak signal and also receiving stray energy locally from said local transmitter, a magic-T mixer, means connecting the H arm of said mixer to be energized from said pick-up circuit, a transmission line connecting said carrier-wave generator to the E arm of said mixer and including means for supplying signal energy of adjustable phase and amplitude to said E arm from said generator, a detector connected to each side-arm of said mixer by a circuit tuned to a different frequency from said carrier-wave generator, a transformer comprising two secondary windings wound on adjacent portions of a coil form, but in opposite directions, and two primary windings wound on the same form, but on opposite sides of said secondary windings, a primary circuit connecting said primary windings in series-aiding relation and energized by said detectors, means connecting the outer terminals of said secondary windings to an output terminal, means connecting the inner terminals of said secondary windings to a second output terminal, and indicator means effectively connected across said output terminals.

3. A radio wave system for receiving a weak signal in the presence of a strong signal transmitted from a local transmitter having a carrier-wave generator, said system comprising a pick-up circuit receiving said weak signal and also receiving stray energy locally from said local transmitter, a magic-T mixer, means connecting the H arm of said mixer to be energized from said pick-up circuit, a transmission line connecting said carrier-wave generator to the E arm of said mixer and including means for supplying signal energy of adjustable phase and amplitude to said E arm from said generator, a detector connected to each side-arm of said mixer by a circuit tuned to a different frequency from said carrier-wave generator, a transformer comprising two secondary windings wound on adjacent portions of a coil form, but in opposite directions, and two primary windings wound on the same form, but on opposite sides of said secondary windings, a connection for energizing one primary winding from one of said detectors and including in series therewith an adjustable impedance and a low-pass filter, a connection for energizing the second primary winding from the other detector and including in series therewith an adjustable impedance and a low-pass filter, means connecting the outer terminals of said secondary windings to an output terminal, means connecting the inner terminals of said secondary windings to a second output terminal, and indicator means effectively connected across said output terminals.

4. A radio wave system comprising a carrier-wave generator, a noise generator impressing noise modulations upon said carrier wave, a transmission channel for radiating said noise-modulated carrier wave, a receiver including a magic-T mixer, a receiving channel connected to the H arm of said mixer and being tuned to receive a signal from a remote point of a different frequency from said carrier-wave generator and being coupled locally to said transmission channel to pick up a small amount of energy therefrom, a transmission line including a variable attenuator and a variable phase-shifter for diverting energy of adjustable phase and amplitude from said transmission channel into the E arm of said mixer, a detector connected to each side-arm of said mixer and operating to derive beat-frequency signals and direct-current pulses from the signal energy supplied to the H and E arms of said mixer, a transformer comprising two secondary windings wound on adjacent portions of a coil form, but in opposite directions, and two primary windings wound on the same form, but on opposite sides of said secondary windings, two conductive circuits for energizing said primary windings in series-aiding relation from said detectors respectively, means connecting the outer terminals of said secondary windings to an output terminal, means connecting the inner terminals of said secondary windings to a second output terminal, and indicator means effectively connected across said output terminals.

5. A radio wave system comprising a carrier-wave generator, a noise generator impressing noise modulations upon said carrier wave, a transmission channel for radiating said noise-modulated carrier wave, a receiver including a magic-T mixer, a receiving channel connected to the H arm of said mixer and being tuned to receive a signal from a remote point of a different frequency from said carrier-wave generator and being coupled locally to said transmission channel to pick up a small amount of energy therefrom, a transmission line including a variable attenuator and a variable phase-shifter for diverting energy of adjustable phase and amplitude from said transmission channel into the E arm of said mixer, a detector connected to each side-arm of said mixer and operating to derive beat-frequency signals and direct-current pulses from the signal energy supplied to the H and E arms of said mixer, a transformer comprising two secondary windings wound on adjacent portions of a coil form, but in opposite directions, and two primary windings wound on the same form, but on opposite sides of said secondary windings, a conductive connection from one detector to one terminal of one primary winding, a conductive return connection from the second terminal of said one primary coil and including an adjustable impedance and a low-pass filter, a conductive connection from the other detector to one terminal of the second primary winding, a return connection from the second terminal of said other primary winding including an adjustable impedance and a low-pass filter, a by-pass condenser connecting the said second terminals of said primary windings together, means connecting the outer terminals of said secondary windings to an output terminal, means connecting the inner terminals of said secondary windings to a second output terminal, and indicator means effectively connected across said output terminals.

6. A radio wave system for receiving a weak signal in the presence of a strong signal transmitted from a locally modulated transmitter having a carrier-wave generator, said system comprising a pick-up circuit receiving said weak signal on a carrier frequency different from that of said local transmitter and also receiving stray energy locally from said local transmitter, a magic-T mixer, means connecting the H arm of said mixer to be energized from said pick-up circuit by energy of said weak signal, a transmission line connecting the carrier-wave generator of said local transmitter to the E arm of said mixer and including means for supplying signal energy of adjustable phase and amplitude to said E arm from said generator, a detector connected to each side-arm of said mixer by a circuit tuned to the received weak signal, said detectors operating to derive beat-frequency signals from the energy of said weak signal and said locally modulated signal, an indicator, and means connecting said detectors to said indicator in opposing relation with respect to detected energy derived from said local transmitter and in cumulative relation with respect to said beat-frequency signals.

References Cited in the file of this patent
UNITED STATES PATENTS

| | | |
|---|---|---|
| 2,475,474 | Bruck et al. | July 5, 1949 |
| 2,666,134 | Dicke | Jan. 12, 1954 |
| 2,705,752 | Pound | Apr. 5, 1955 |